United States Patent
Yang et al.

(10) Patent No.: US 9,829,203 B2
(45) Date of Patent: Nov. 28, 2017

(54) SELF-HEATED ENCLOSURE WITH CARBON FIBER

(71) Applicant: University of Alaska Anchorage, Anchorage, AK (US)

(72) Inventors: Zhaohui Yang, Anchorage, AK (US); Benjamin Still, Anchorage, AK (US)

(73) Assignee: UNIVERSITY OF ALASKA ANCHORAGE, Anchorage, AK (US)

( * ) Notice: Subject to any disclaimer, the term of this patent is extended or adjusted under 35 U.S.C. 154(b) by 0 days.

(21) Appl. No.: 14/946,230

(22) Filed: Nov. 19, 2015

(65) Prior Publication Data
US 2016/0138814 A1    May 19, 2016

Related U.S. Application Data

(60) Provisional application No. 62/081,853, filed on Nov. 19, 2014.

(51) Int. Cl.
| | |
|---|---|
| H05B 1/02 | (2006.01) |
| F24D 19/10 | (2006.01) |
| F24D 13/02 | (2006.01) |
| H05B 3/14 | (2006.01) |
| H05B 3/26 | (2006.01) |
| H05B 3/28 | (2006.01) |

(52) U.S. Cl.
CPC ......... *F24D 19/1096* (2013.01); *F24D 13/02* (2013.01); *H05B 3/145* (2013.01); *H05B 3/26* (2013.01); *H05B 3/28* (2013.01); *H05B 2214/04* (2013.01); *Y02B 30/26* (2013.01)

(58) Field of Classification Search
CPC .... F24D 19/1096; F24D 13/03; F24D 13/024; H05B 3/145; H05B 3/26; H05B 3/28; H05B 2214/04; Y02B 30/26
USPC .......................... 219/504, 209, 210, 494, 213
See application file for complete search history.

(56) References Cited

U.S. PATENT DOCUMENTS

| | | | | |
|---|---|---|---|---|
| 3,632,964 A | * | 1/1972 | Dapot ...................... | H05B 3/00 219/200 |
| 4,611,182 A | * | 9/1986 | Chauvin ................... | H03L 1/04 219/210 |
| 6,049,256 A | * | 4/2000 | Fry ....................... | H03H 9/0528 310/343 |
| 6,229,123 B1 | * | 5/2001 | Kochman ........... | A41D 13/0051 219/529 |
| 6,285,005 B1 | * | 9/2001 | Aakalu .................... | H05B 3/14 219/209 |
| 6,630,869 B2 | * | 10/2003 | Flynn ...................... | H03B 5/04 331/66 |
| 8,704,630 B2 | * | 4/2014 | Melvin, Jr. .............. | G05B 9/02 219/201 |

(Continued)

*Primary Examiner* — Mark Paschall
(74) *Attorney, Agent, or Firm* — Ballard Spahr LLP (57) ABSTRACT

Provided is a self-heated enclosure with carbon fiber. An example system can comprise an enclosure defining an interior chamber. The system can comprise at least one electrically conductive carbon fiber member configured in relation to the enclosure to provide a thermal output to the interior chamber when a voltage is applied to the at least one electrically conductive carbon fiber member. The system can further comprise a power source electrically coupled to the at least one electrically conductive carbon fiber member. The power source can be configured to selectively apply the voltage to the at least one electrically conductive carbon fiber member.

20 Claims, 7 Drawing Sheets

(56) References Cited

U.S. PATENT DOCUMENTS

| 9,347,671 B2* | 5/2016 | Bringe .................. F24C 7/00 |
| 2004/0188418 A1* | 9/2004 | Aisenbrey ........... B29C 45/0013 |
| | | 219/528 |
| 2005/0092727 A1* | 5/2005 | Fraley .................... G11B 27/36 |
| | | 219/209 |
| 2010/0089895 A1* | 4/2010 | Brown .................... H05B 3/30 |
| | | 219/209 |

* cited by examiner

FIG. 7

SELF-HEATED ENCLOSURE WITH CARBON FIBER

CROSS REFERENCE TO RELATED APPLICATION

This application claims priority to U.S. Provisional Application No. 62/081,853 filed Nov. 19, 2014, herein incorporated by reference in its entirety.

BACKGROUND

Currently, fan driven electric heaters are the standard for heating enclosures to protect mechanical, electrical and electronic equipment sensitive to low temperatures, condensation, and corrosion. However, electric heaters can warm up to temperatures well beyond the limitations of equipment intended to protect and they pose potential dangers to workers close to the equipment. Thus, space limitations need to be applied to electric heaters. Electric heaters can also create non-uniform temperature throughout a heated enclosure, possibly leading to some areas not meeting the protection required tier continued operation.

SUMMARY

It is to be understood that both the following general description and the following detailed description are exemplary and explanatory only and are not restrictive, as claimed. In an aspect, provided is a self-heated enclosure with carbon fiber. An example system can comprise an enclosure defining an interior chamber. The system can comprise at least one electrically conductive carbon fiber member configured in relation to the enclosure to provide a thermal output to the interior chamber when a voltage is applied to the at least one electrically conductive carbon fiber member. The system can further comprise a power source electrically coupled to the at least one electrically conductive carbon fiber member. The power source can be configured to selectively apply the voltage to the at least one electrically conductive carbon fiber member.

In another aspect, an example method of heating an enclosure is disclosed. A temperature measurement of an interior chamber defined by an enclosure can be received from a sensor configured to measure temperature of the interior chamber. The temperature measurement can be received by a feedback controller. If the temperature measurement of the interior chamber falls below a predetermined threshold temperature, a power source can be selectively activated by the feedback controller that is in signal communication with the sensor and the power source. The power source, when activated, can apply a voltage to at least one electrically conductive carbon fiber member configured in relation to the enclosure to provide a thermal output to the interior chamber when the voltage is applied to the at least one electrically conductive carbon fiber member.

In yet another aspect, an example system can comprise an enclosure comprising at least one electrically conductive carbon fiber member. The system can comprise a power source electrically coupled to the at least one electrically conductive carbon fiber member. The power source can be configured to apply a voltage to the at least one electrically conductive carbon fiber member when the power source is activated.

Additional advantages will be set forth in part in the description which follows or may be learned by practice. The advantages will be realized and attained by means of the elements and combinations particularly pointed out in the appended claims. It is to be understood that both the foregoing general description and the billowing detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
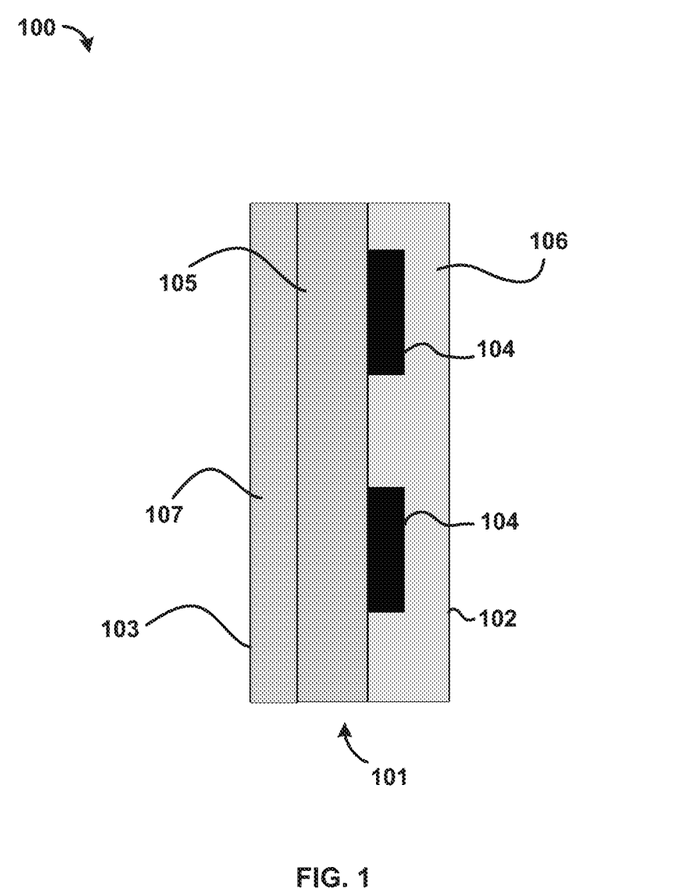
FIG. 1 illustrates a cross section view of enclosure wall of an example system.

FIG. 1 illustrates a cross section view of a wall 101 of an example of an enclosure 100. In an aspect, the enclosure 100 can comprise a wall 101. The enclosure 100 can comprise an interior surface 102 and an exterior surface 103. The enclosure 100 can define an interior chamber. The interior chamber can house temperature sensitive equipment. The enclosure 100 can comprise an electrically conductive carbon fiber member 104. The enclosure 100 can further comprise a thermally insulating layer 105, a thermally conductive layer 106, and/or a structural layer 107. As an example, the electrically conductive carbon fiber member 104 can comprise carbon fiber tape (e.g., 1"-6" wide 0.012" thick plain weave fiber tape). As another example, the electrically conductive carbon fiber member 104 can comprise substantially conforming carbon fiber netting.

In an aspect, the electrically conductive carbon fiber member 104 can be configured in relation to the interior surface 102 and/or interior chamber to provide a thermal output to the interior chamber when a voltage is applied to the electrically conductive carbon fiber member 104. For example, the electrically conductive carbon fiber member 104 can be disposed in the wall 101 of the enclosure 100 between the interior surface 102 and the exterior surface 103. In another example, the electrically conductive carbon fiber member 104 can be coupled, attached, adjacent, fastened, adhered, combinations thereof, and the like to the interior surface 102 of the enclosure 100. In an example, the electrically conductive carbon fiber member 104 can be disposed between the structural layer 107 and the interior surface 102. The structural layer 107 can comprise a material to provide structural support to the enclosure 100. For example, the material can be wood, a metal, a plastic material, combinations thereof and the like.

In another example, the enclosure 100 can comprise the thermally insulating layer 105. The thermally insulating layer 105 can be disposed between the exterior surface 103 and the electrically conductive carbon fiber member 104. In another example, the thermally insulating layer 105 can be disposed between the structural layer 107 and the electrically conductive carbon fiber member 104. In another example, the structural layer 107 can comprise the thermally insulating layer 105. The thermally insulating layer 105 can be electrically insulating and/or thermally insulating. As an example, the thermally insulating layer 105 can comprise a gas, polyurethane foam, wood, mineral wool, a low thermal conductivity liquid, chemical-based fibers, natural fibers, fiberglass, biofoams, any other material with a low thermal conductivity, combinations thereof, and the like. The thermally insulating layer 105 can be configured to regulate a thermal gradient between the interior surface 102 and the exterior surface 103 of the enclosure 100. For example, the thermally insulating layer 105 can limit the rate at which thermal energy transfers from the interior chamber of the enclosure 100 to the exterior and vice versa.

In another example, the enclosure 100 can comprise the thermally conductive layer 106. The thermally conductive layer 106 can be disposed between the electrically conductive carbon fiber member 104 and the interior surface 102. In another example, the electrically conductive carbon fiber member 104 can be coupled, attached, adjacent, fastened, adhered, combinations thereof, and the like to the thermally conductive layer 106 which can make up the interior surface 102. The thermally conductive layer 106 can comprise a material with a high thermal conductivity, such as a metal, carbon nanotubes, diamond, ceramics, graphene, and the like. In an aspect, the thermally conductive layer 106 can comprise a material that is electrically insulating as well such as minerals, carbon nanotubes, diamond, certain ceramics with a high dielectric constant, and the like.

Figure 2:
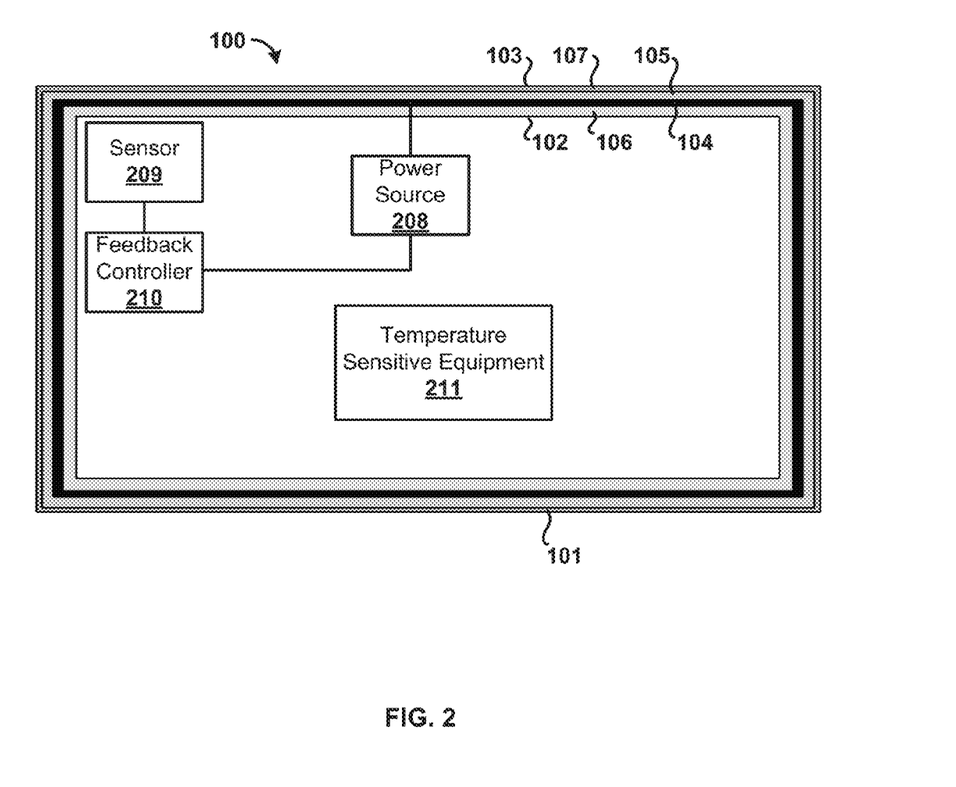
FIG. 2 illustrates a plan view of an enclosure.

FIG. 2 illustrates a cutaway, plan view of a system 200. The system 200 can comprise the enclosure 100 and a power source 208. The system 200 can also comprise a sensor 209 and a feedback controller 210. In an aspect, the power source 208 can be electrically coupled to the electrically conductive carbon fiber member 104. In an aspect, the power source 208 can be configured to selectively apply a voltage to the electrically conductive carbon fiber member 104 to generate a desired thermal output for heating the interior chamber of the enclosure 100 to a selected temperature/predetermined threshold temperature. In an aspect, the power source 208 can be a low voltage AC and/or DC power source. As an example, the low voltage power source can comprise a battery, a solar cell, a wind-up motor, a kinetic power source, a power cord configured for an AC wall outlet, a rechargeable power supply, combinations thereof, and the like. The power source 208 can be electrically coupled to two ends of the electrically conductive carbon fiber member 104 (e.g., a strip or multiple strips of the carbon fiber tape). As an example, a positive end of the power source 208 can be connected to one end of the electrically conductive carbon fiber member 104, and a negative end of the power source 208 can be electrically coupled to the other end of the electrically conductive carbon fiber member 104. The power source 208 can be attached on the interior surface 102 of the enclosure 100 and/or integrated into the wall 101 of the enclosure 100.

The system 200 can further comprise a feedback controller 210 operatively coupled to the power source 208. In an aspect, the feedback controller 210 can comprise a sensor 209 configured to measure the temperature of the interior chamber. In an aspect, the feedback controller 210 can comprise the power source 208. In another aspect, the feedback controller 210 can be configured to maintain the selected temperature that can be defined as a predetermined threshold temperature and or a selected temperature range. As an example, the feedback controller 210 can comprise a thermostat. In another example, the feedback controller 210 can comprise a computing device that can perform a computer implemented method of temperature control to the interior chamber defined by the enclosure 100. In an aspect, the enclosure 100 can comprise temperature sensitive equipment 211. The temperature sensitive equipment 211 can comprise electronic, electrical, and/or mechanical equipment that can operate and/or maintain stability at certain temperature ranges. As an example, some temperature sensitive equipment 211 can be susceptible to malfunction or not run as optimally at temperatures below 0 degrees Celsius. Examples of such equipment can include data loggers, communication equipment, transducers, sensors, and certain mechanical equipment, and the like.

As illustrated in FIG. 2, the enclosure 100 is in the shape of a rectangular prism. However, other structural shapes are contemplated such as, but not limited to, a sphere, cylinder, a cube, a pyramid, a cone, a domed cylinder, and the like. The enclosure 100 can comprise one or more openings, access ports, conduits, view ports, doors, and the like to provide access to the interior chamber for the temperature sensitive equipment 211 and transferring of materials, fluids, electricity, and the like between the exterior surface 103 and interior surface 102 of the enclosure 100 or any of the layers therebetween. The enclosure 100 can be configured to be portable in that the enclosure 100 can be transportable by hand. The dimensions can range from tens of inches to tens of feet (e.g., 10", 20", 40", 5', 10', 20', 30' and the like)

In an aspect, the feedback controller 210 can receive an instruction that indicates the interior chamber of the enclosure 100 should be at a predetermined threshold temperature. The feedback controller 210 can be in signal communication with the sensor 209. The sensor 209 can be configured to measure temperature of the interior chamber and generate a temperature measurement. The sensor 209 can transmit the temperature measurement of the interior chamber to the feedback controller 210. The feedback controller 210 can receive the temperature measurement from the sensor 209 and compare the temperature measurement to the predetermined threshold temperature. If the temperature measurement of the interior chamber falls below the predetermined threshold temperature, the feedback controller 210, which can be in signal communication with the power source 208, can activate the power source 208. When the power source 208 is activated, the power source 208 can supply a voltage to the electrically conductive carbon fiber member 104. The electrically conductive carbon fiber member 104 can be configured in relation to the enclosure 100 to provide a thermal output the interior chamber when the voltage is applied to the electrically conductive carbon fiber member 104. The electrically conductive carbon fiber member 104 can be configured to be electrically resistive so that if a voltage is applied to the electrically conductive carbon fiber member 104, then the electrically conductive carbon fiber member 104 resists the flow of electrons, which generates a resistive thermal output. The resistance of the electrically conductive carbon fiber member 104 carbon fiber can range from a few Ohms to tens of Ohms (e.g., 1 Ohm, 2 Ohms, 5 Ohms, 10 Ohms, 30 Ohms, 60 Ohms, 100 Ohms, and the like. The voltage applied to the electrically conductive carbon fiber member can range from tens of volts to hundreds of volts (e.g., 5V, 10V, 12V, 32V, 50V, 100V, 120V, 150V, 240V, and the like).

If the temperature measurement of the interior chamber is at or above the predetermined threshold temperature or if the temperature measurement reaches a maximum temperature threshold, then the feedback controller 210 can signal to the power source 208 to deactivate. If the power source is deactivated, then the power source 208 can suspend voltage to the electrically conductive carbon fiber member 104. In another example, the sensor 209 can measure the interior surface 102 and/or the electrically conductive carbon fiber member 104. A temperature measurement of the interior surface 102 and/or the electrically conductive carbon fiber member 104 can be compared to the predetermined threshold temperature.

Figure 3:
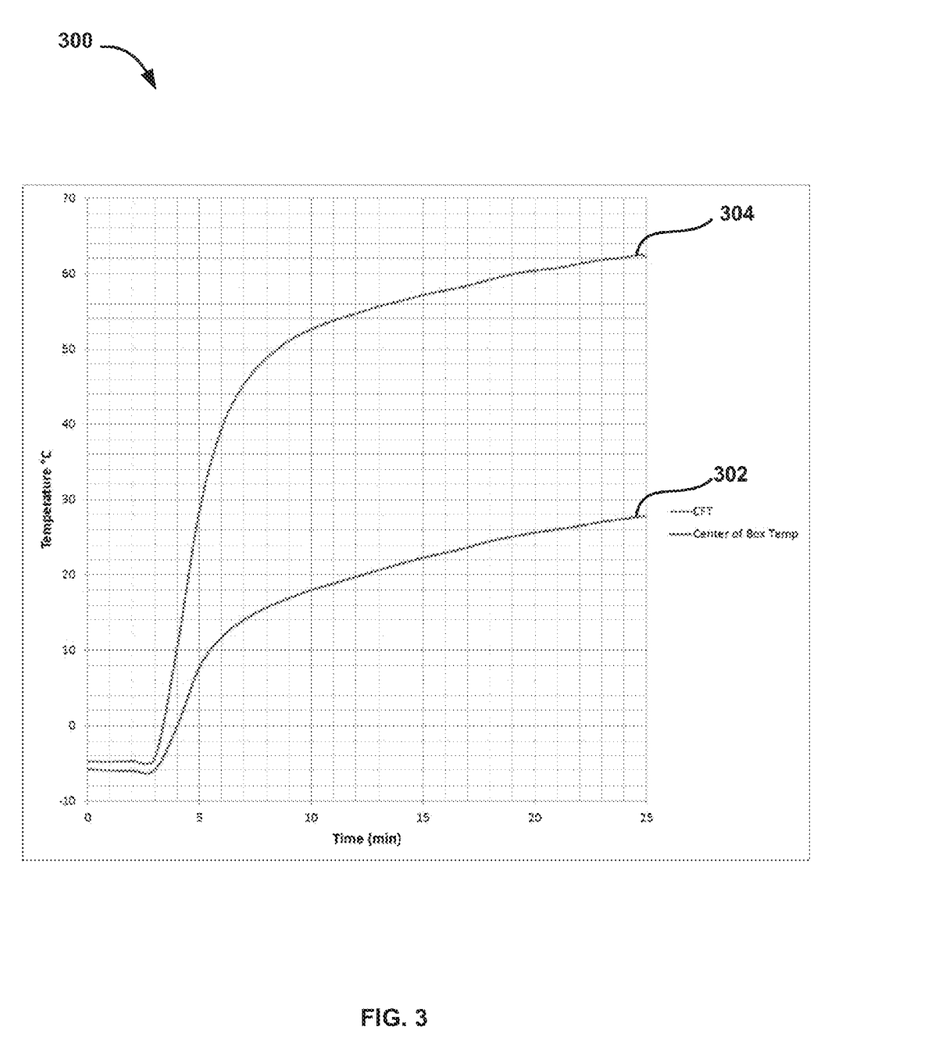
FIG. 3 illustrates temperature of an electrically conductive carbon fiber member am a temperature measurement of an interior chamber of an enclosure.
Figure 4:
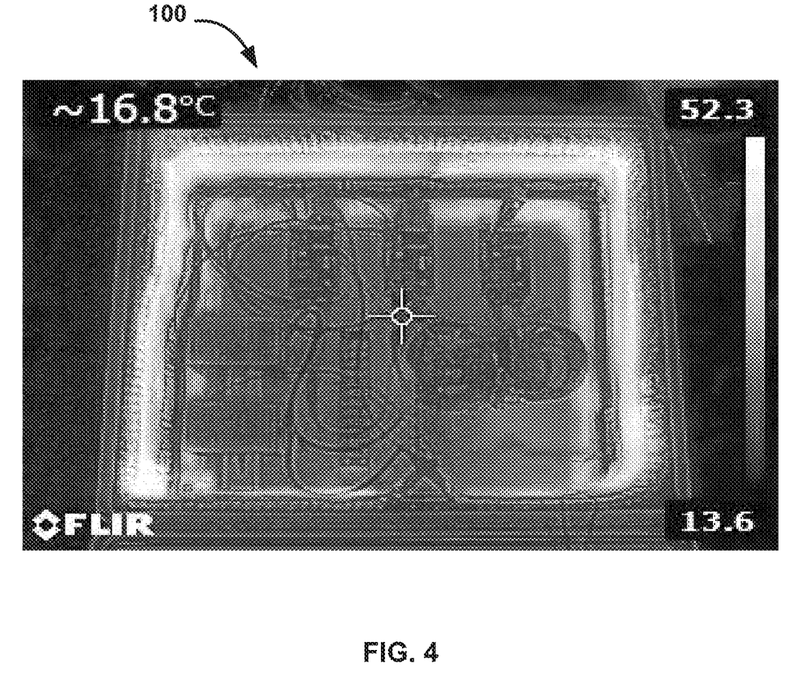
FIG. 4 illustrates infrared image of an enclosure.

The disclosed systems can provide uniform heating in an enclosure 100. The enclosure 100 can be heated from all sides, creating a warm, low moisture, low corrosion environment for sensitive instruments. In an aspect, the electrically conductive carbon fiber member 104 (e.g., carbon fiber tape or carbon fiber net) can be configured to not heat up the enclosure 100 to a high enough temperature to cause a safety problem. FIG. 3 illustrates a graph 300 of temperature of an electrically conductive carbon fiber member and temperature of an interior chamber of an enclosure at an ambient temperature of −6° C. A first temperature plot 302 of the interior chamber of the enclosure and a second temperature plot 304 of the electrically conductive carbon fiber member in FIG. 3 show how the enclosure can be heated up when subjected to subfreezing ambient temperatures. FIG. 4 illustrates an infrared image of an enclosure 100 comprising an electrically conductive carbon fiber member. The enclosure illustrated is 1.5'×1.3'×0.8'. The electrically conductive carbon fiber member can comprise a single strip of carbon fiber tape 3" wide and 5.6' long with an electrical resistance of 5.6 Ohms. However, other dimensions of the enclosure 100 and the electrically conductive carbon fiber member as well as the resistance of the electrically conductive carbon fiber member are conternplated. The electrically conductive carbon fiber member can be attached on the interior surface of the enclosure. The uniformity of the temperature can be shown by an infrared image in FIG. 4.

Figure 5:
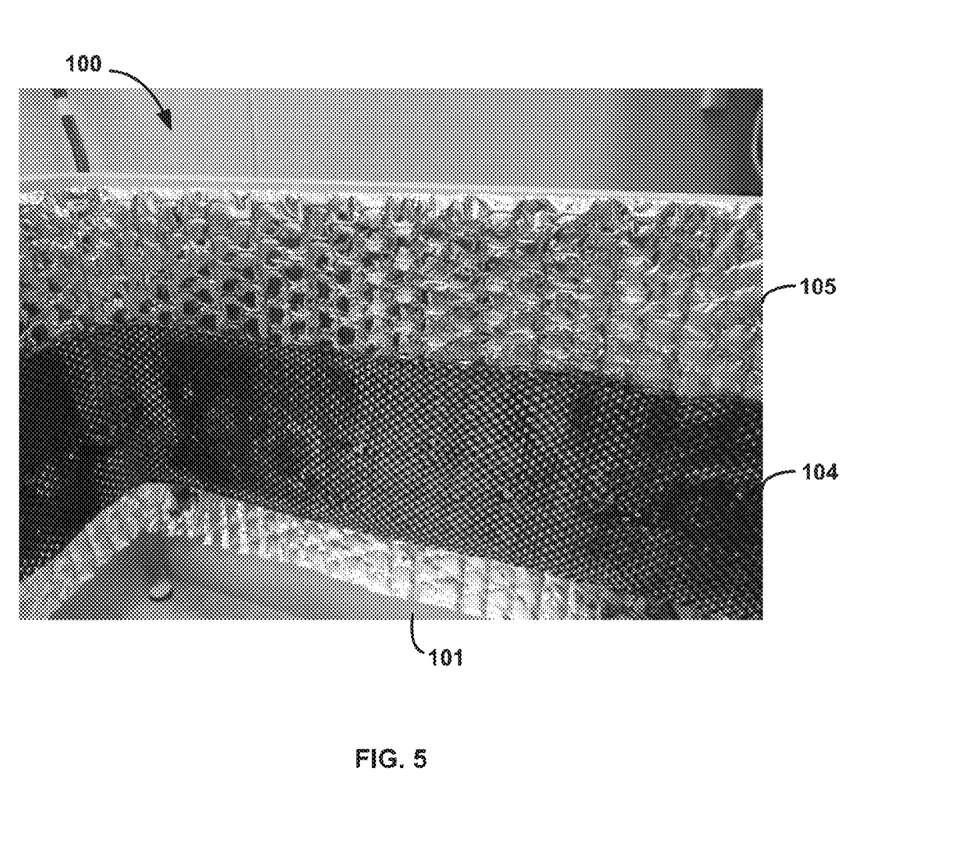
FIG. 5 illustrates a thermally insulating layer of an enclosure with an electrically conductive carbon fiber member.

In an aspect, the electrically conductive carbon fiber member 104 (e.g., carbon fiber tape or carbon fiber net) can be attached directly to the interior surface of an enclosure using an adhesive as shown in FIG. 5. The carbon fiber tape or net can also be integrated into the wall 101 of the enclosure 100 where a thermally insulating layer 105 can be thermally and/or electrically insulating and a thermally conductive layer can be electrically insulating but thermally conductive. The carbon fiber tape or net can be placed in between the thermally insulating layer 105 and a thermally conductive layer 106, as shown in FIG. 1. A power source 208, a sensor 209, and a feedback controller 210 can be built in the enclosure 100 and electrically coupled and in signal communication with the power source 208 (e.g., 110V AC power supply), shown in FIG. 2. The feedback controller 210 can allow for temperature control and minimize the energy output needed to heat the enclosure 100.

Figure 6:
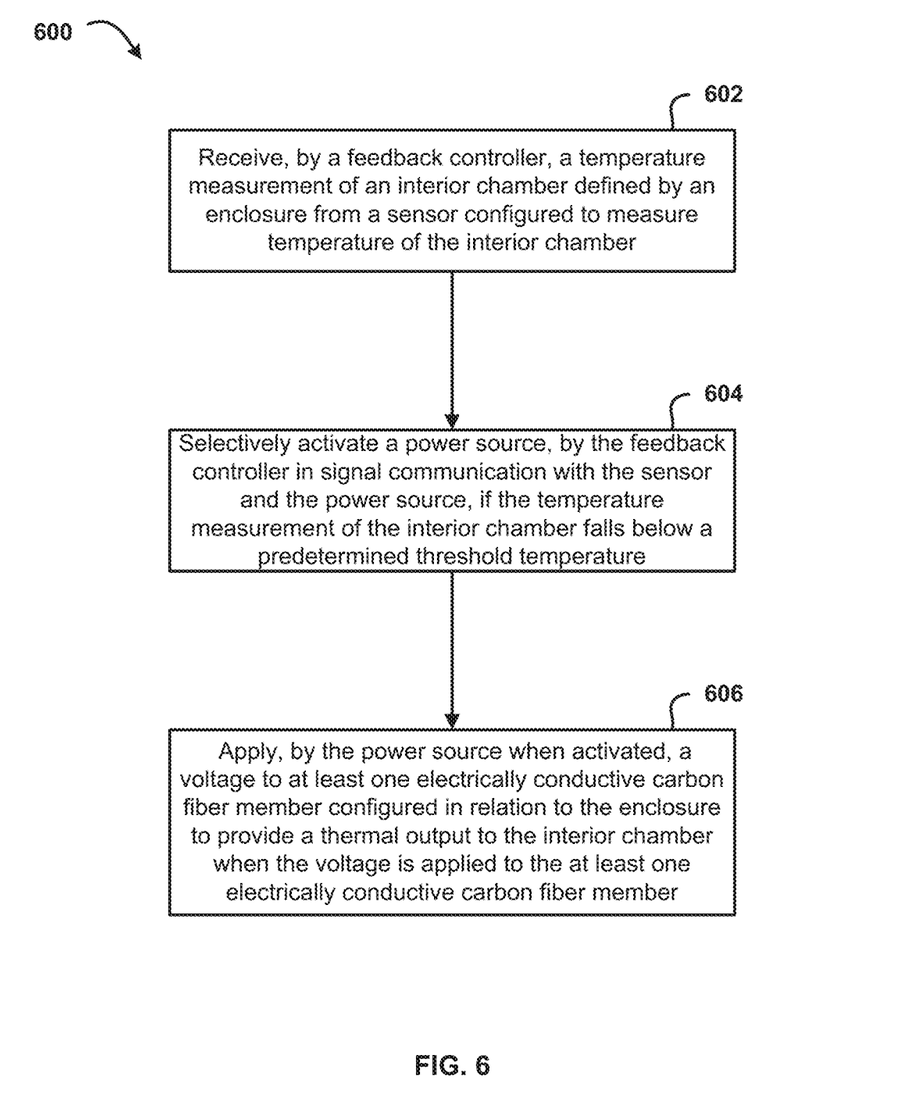
FIG. 6 illustrates a flowchart of an method.

FIG. 6 illustrates a flowchart of a method 600 of temperature control of an enclosure comprising an electrically conductive carbon fiber member. In step 602, a feedback controller can receive a temperature measurement of an interior chamber defined by an enclosure. The feedback controller can be in signal communication with the sensor. The temperature measurement can be sent to the feedback controller from a sensor configured to measure temperature of the interior chamber of the enclosure. As an example, the feedback controller and sensor can comprise a thermostat. In another example, the feedback controller can be a computing device. In another example, the sensor can measure an interior surface and/or at least one electrically conductive carbon fiber member configured in relation to the enclosure to provide a thermal output to the interior chamber when a voltage is applied to the at least one electrically conductive carbon fiber member. A temperature measurement of the interior surface and/or the electrically conductive carbon fiber member can be compared to a predetermined threshold temperature.

In step 604, if the temperature measurement of the interior chamber falls below the predetermined threshold temperature, the feedback controller can selectively activate a power source. The feedback controller can be in signal communication with the power source to control the power source. Furthermore, the feedback controller can be in electrical communication with the power source and receive electrical energy from the power source. The power source can be in electrical communication with the at least one electrically conductive carbon fiber member.

In step 606, the power source, when activated, can apply a voltage to the at least one electrically conductive carbon fiber member. In an aspect, the feedback controller can comprise the power source. The at least one electrically conductive carbon fiber member can be configured in relation to the enclosure to provide a thermal output to the interior chamber when the voltage is applied to the at least one electrically conductive carbon fiber member. In an aspect, the enclosure can comprise a thermally insulating layer. The at least one electrically conductive carbon fiber member can be disposed between the thermally insulating layer and the interior chamber. In another aspect, the enclosure can comprise an electrically insulating layer disposed between the at least one electrically conductive carbon fiber member and the interior chamber. In yet another aspect, the enclosure can comprise a thermally conductive layer disposed between the at least one electrically conductive carbon fiber member and the interior chamber. The electrically insulating layer and the thermally conductive layer can be the same layer comprising a material that is both thermally conductive and electrically insulating such as carbon nanotubes, diamond, certain ceramics with a high dielectric constant, combinations thereof, and the like.

In an aspect, the feedback controller can deactivate the power source if the temperature measurement of the interior chamber satisfies the predetermined threshold temperature. If the temperature measurement of the interior chamber is at or above the predetermined threshold temperature or if the temperature measurement reaches a maximum temperature threshold, then the feedback controller can signal to the power source to deactivate. If the power source is deactivated, then the power source can suspend transmission of the voltage to the electrically conductive carbon fiber member.

In an aspect, an example method can comprise providing an enclosure. The enclosure can comprise at least one electrically conductive carbon fiber member. The enclosure can comprise an interior surface and an exterior surface. The enclosure can define an enclosed interior chamber. In an example, the at least one electrically conductive carbon fiber member can be mounted on a portion of the interior surface of a wall of the enclosure. In another example, the at least one electrically conductive carbon fiber member can be mounted on a thermally insulating layer. The method can further comprise coupling a power source to the electrically conductive carbon fiber member. The power source can be adapted to selectively apply a voltage to the electrically conductive carbon fiber member to generate a thermal output for heating the interior chamber to a predetermined threshold temperature a selected temperature). The interior chamber can be heated to the predetermined threshold temperature. The method can further comprise coupling a feedback controller (e.g., a thermostat) to the power source. The feedback controller can comprise a sensor configured to measure the temperature of the interior chamber and/or a resistive thermal output of the at least one electrically conductive carbon fiber member. The sensor can generate a temperature measurement that can be sent to the feedback controller. The feedback controller can be configured to receive the temperature measurement from the sensor. The feedback controller can be configured to selectively activate the power source if the temperature measurement falls below a predetermined threshold temperature.

This disclosed methods and systems can increase the efficiency of heated enclosures and better protect against low temperature, moisture, and corrosion for sensitive instrumentation than the current fan driven heaters. In an aspect, the electrically conductive carbon fiber member can facilitate to reinforce the structure of the enclosure. In another aspect, the temperature of the electrically conductive carbon fiber member (e.g., carbon fiber tape and/or a carbon fiber net) can be kept at a safe temperature for working around the system.

In an aspect, the carbon fiber tape of the disclosed system can be readily installed into existing enclosures or integrated into new enclosures. The disclosed methods and systems can be applicable to all existing boxes and/or containers which need heating. For example, the disclosed methods and systems can be applicable to utility enclosures in cold regions. As another example, the disclosed methods and systems can be applicable to climate enclosures/boxes which need to be warm. As another example, the disclosed methods and systems can be applicable to portable containers/storage enclosures that need to be warm in a cold environment. As another example, the disclosed methods and systems can be applicable to instrumentation/electronic/electric equipment which needs to be warm.

Figure 7:
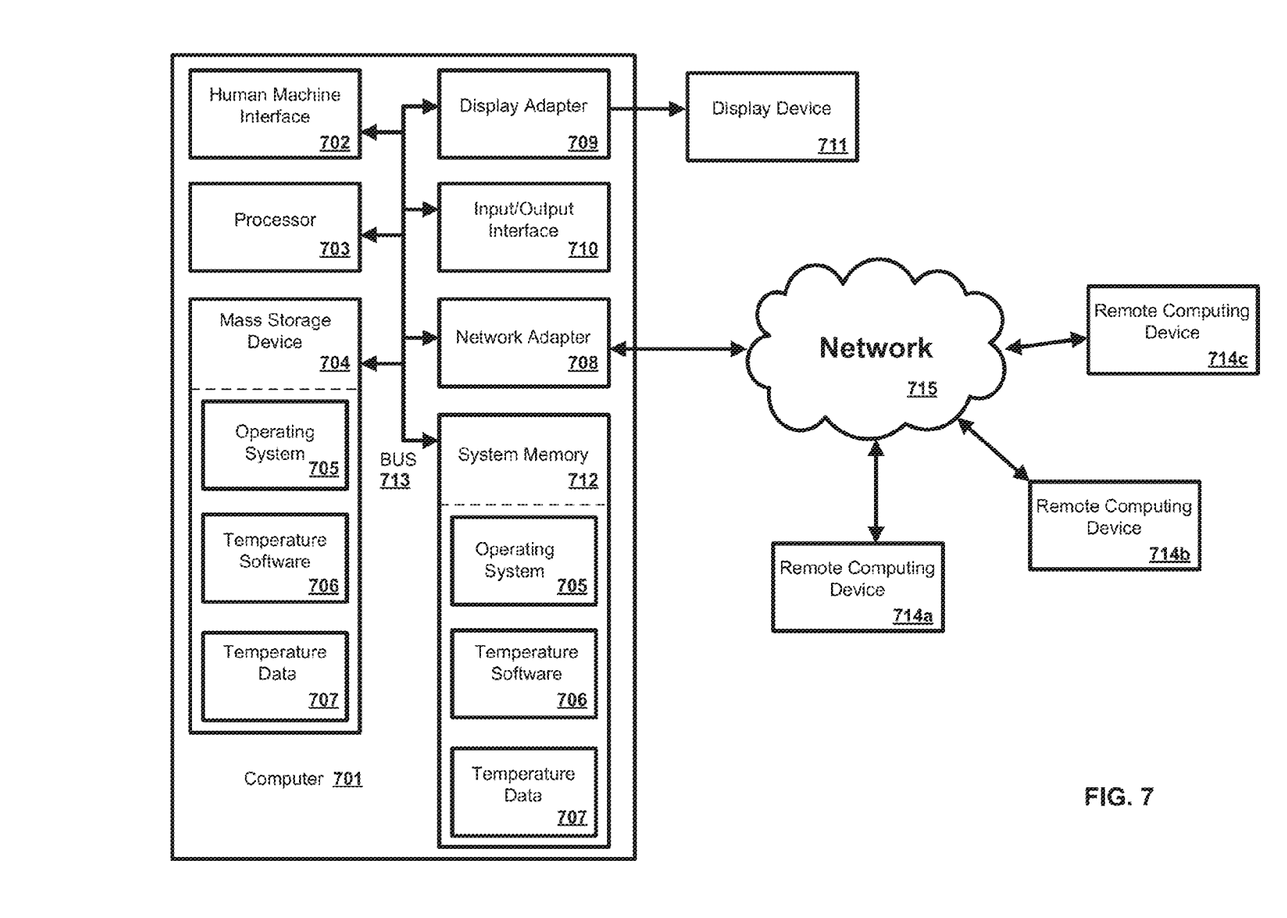
FIG. 7 is a block diagram illustrating an exemplary computing device.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the temperature control software 706 as illustrated in FIG. 7 and described below. In one exemplary aspect, the units can comprise a feedback controller 210 as illustrated in FIG. 2 and described below.

FIG. 7 is a block diagram illustrating a computing device such as the feedback controller 210 of FIG. 2 for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, temperature control software 706, temperature data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as temperature data 707 and/or program modules such as operating system 705 and temperature control software 706 that are immediately accessible to and/or are presently operated on by the processing unit 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and temperature control software 706. Each of the operating system 705 and temperature control software 706 (or some combination thereof) can comprise elements of the programming and the temperature control software 706. Temperature data 707 can also be stored on the mass storage device 704. Temperature data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like.

The computer 701 can operate in a networked environment using logical connections to one or more remote computing devices 714a,b,c. By way of example, a remote computing device can be a personal computer, portable computer, a server, a router, a network computer, a peer device or other common network node, and so on. Logical connections between the computer 701 and a remote computing device 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and the Internet 715.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of temperature control software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
   an enclosure defining an interior chamber;
   at least one electrically conductive carbon fiber member comprising substantially conforming carbon fiber netting and is configured in relation to the enclosure to provide a thermal output to the interior chamber when a voltage is applied to the at least one electrically conductive carbon fiber member; and
   a power source electrically coupled to the at least one electrically conductive carbon fiber member, wherein the power source is configured to selectively apply the voltage to the at least one electrically conductive carbon fiber member.

2. The system of claim 1, further comprising a feedback controller in communication with the power source, wherein the feedback controller comprises a sensor to measure temperature of the interior chamber and wherein the feedback controller is configured to control activation of the power source based on the temperature of the interior chamber.

3. The system of claim 1, wherein the enclosure comprises a thermally insulating layer, wherein the at least one electrically conductive carbon fiber member is disposed between the thermally insulating layer and the interior chamber.

4. The system of claim 1, wherein the enclosure comprises an electrically insulating layer disposed between the at least one electrically conductive carbon fiber member and the interior chamber.

5. The system of claim 4, wherein the electrically insulating layer is thermally conductive.

6. The system of claim 1, wherein the enclosure comprises a thermally conductive layer disposed between the at least one electrically conductive carbon fiber member and the interior chamber.

7. The system of claim 1, wherein the at least one electrically conductive carbon fiber member comprises a carbon fiber tape.

8. The system of claim 1, wherein the at least one electrically conductive carbon fiber member comprises a carbon fiber net.

9. A method comprising:
receiving, by a feedback controller, a temperature measurement of an interior chamber defined by an enclosure from a sensor configured to measure temperature of the interior chamber; and
selectively activating a power source, by the feedback controller in signal communication with the sensor and the power source, if the temperature measurement of the interior chamber falls below a predetermined threshold temperature, wherein the power source, when activated, applies a voltage to at least one electrically conductive carbon fiber member comprising substantially conforming carbon fiber netting and is configured in relation to the enclosure to provide a thermal output to the interior chamber when the voltage is applied to the at least one electrically conductive carbon fiber member.

10. The method of claim 9, further comprising deactivating the power source, by the feedback controller, if the temperature measurement of the interior chamber satisfies the predetermined threshold temperature.

11. The method of claim 9, wherein the enclosure comprises a thermally insulating layer, wherein the at least one electrically conductive carbon fiber member is disposed between the thermally insulating layer and the interior chamber.

12. The method of claim 9, wherein the enclosure comprises an electrically insulating layer disposed between the at least one electrically conductive carbon fiber member and the interior chamber.

13. The method of claim 9, wherein the enclosure comprises a thermally conductive layer disposed between the at least one electrically conductive carbon fiber member and the interior chamber.

14. A system comprising:
an enclosure comprising at least one electrically conductive carbon fiber member comprising substantially conforming carbon fiber netting; and
a power source electrically coupled to the at least one electrically conductive carbon fiber member, wherein the power source is configured to apply a voltage to the at least one electrically conductive carbon fiber member when the power source is activated.

15. The system of claim 14, wherein the at least one electrically conductive carbon fiber member generates a resistive thermal output when the voltage is applied to the at least one electrically conductive carbon fiber member.

16. The system of claim 14, wherein the enclosure comprises an interior surface and an exterior surface.

17. The system of claim 16, wherein the enclosure comprises a thermally insulating layer, wherein the thermally insulating layer is disposed between the at least one electrically conductive carbon fiber member and the exterior surface.

18. The system of claim 16, wherein the enclosure comprises a thermally conductive layer, wherein the thermally conductive layer is disposed between the at least one electrically conductive carbon fiber member and the interior surface.

19. The system of claim 16, wherein the at least one electrically conductive carbon fiber member is coupled to the interior surface of the enclosure.

20. The system of claim 14, further comprising:
a sensor configured to generate a temperature measurement of a resistive thermal output of the at least one electrically conductive carbon fiber member; and
a feedback controller in signal communication with the sensor and the power source, wherein the feedback controller is configured to, receive the temperature measurement from the sensor, and selectively activate the power source if the temperature measurement falls below a predetermined threshold temperature.

* * * * *